J. C. VETTER.

Sewing-Machine Tables.

No. 6,056. Reissued Sept. 22, 1874.

Witnesses:
O. F. Mayhew.
Jacob W. Loeper.

Inventor.
John C. Vetter.
Chipman & Hanson
Attys.

UNITED STATES PATENT OFFICE.

JOHN C. VETTER, OF INDIANAPOLIS, INDIANA.

IMPROVEMENT IN SEWING-MACHINE TABLES.

Specification forming part of Letters Patent No. 134,496, dated December 31, 1872; reissue No. 6,056, dated September 22, 1874; application filed July 21, 1873.

*To all whom it may concern:*

Be it known that I, JOHN C. VETTER, of Indianapolis, in the county of Marion and State of Indiana, have invented certain Improvements in the Tables and Folding Covers of Sewing-Machines, of which the following is a specification:

My invention has relation to folding covers for sewing-machines; and the novelty consists in the construction and arrangement of the folding cover and the recessed and slotted table-top in such a manner that the cover can be readily opened, and compactly folded into the table-top out of sight, and out of the way of the operator, and so as not to present an obstruction to the manipulation of the fabrics in the process of sewing.

My object is to make the covers cheaper, simpler, and more efficient in action than hitherto. This I accomplish by making the table-top of a single solid piece, with a recess or channel at its rear end to receive and support the folding back in a horizontal position when unfolded. The cover is made of four pieces only, and is so hinged that the back and top and front can be thrown back from off the machine, and the end pieces adjusted vertically through slots in the table-top.

Figure 1:
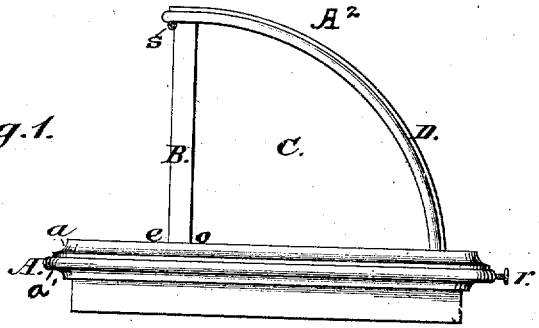
Figure 2:
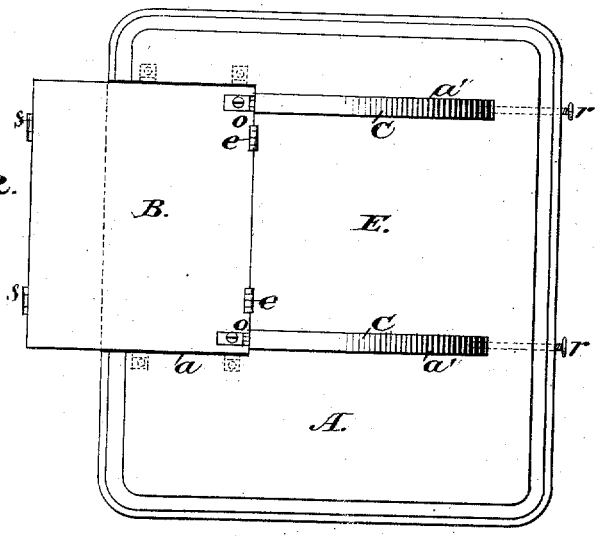
Figure 3:
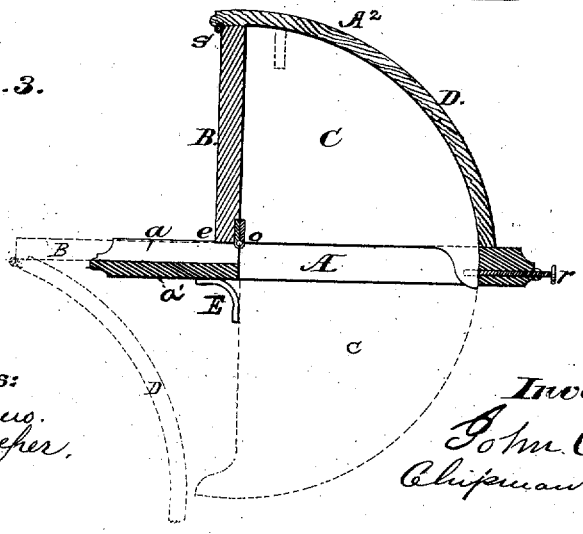

Figure 1 is an end elevation of a sewing-machine table and folding cover embodying my invention. Fig. 2 is a plan view of the same. Fig. 3 is a transverse vertical section of the same.

In the accompanying drawings, A represents the table-top of a sewing-machine, having a recess, *a*, formed in the rear of the middle part, of the same width and thickness as the hinged folding back B, as indicated by dotted lines. $A^2$ represents the folding cover, composed of the back B, end pieces C, and concavo-convex piece D, and is made just large enough to cover the sewing device. The lower edge of the back B is hinged at *e* to the table-top A, at the inner edge or wall of the recess *a*, in such a manner that it will, when turned back, lie in a horizontal position within said recess, with its upper surface even with that of the table, and be supported by the bottom *a'* of the recess. The end pieces C are hinged at *o* to the lower edge of the back B, in such a manner that they may turn down through slots *a''* cut vertically through the top of the table for this purpose, and they are also so arranged that when let down through the table-top their rear edges rest flush with the top, so as to leave a smooth surface, their position below the table being indicated by dotted lines, as shown in Fig. 3. The end pieces C are held in position, when the cover is closed, by means of spring-catches *r*, and when let down, so as to be out of the way of the operator, they are held flush with the table-top by the same means. The concavo-convex piece D is made of a single piece, forming the top and the front to the cover, and is so hinged to the top of the back B at *s* that it is adapted to fit over the sides C when the back and sides are raised in position, and when they are opened the curved top and front hang under the back and table-top A, as shown in Fig. 3.

It will be perceived that the upper edges of the end pieces C are curved, in order that they may pass through the slots *a''* in the table-top.

E indicates springs attached to the under side of the table-top to break the force of any sudden or forcible descent of the end pieces, and thus prevent straining of the hinges.

For this kind of a folding cover, the recess formed in the rear part of the top of the table should not exceed the length and thickness of the back, at the same time leaving a solid portion, *a'*, to afford a rigid and substantial support for the back B when it is unfolded.

By this construction I render unnecessary the secondary top so commonly now made.

I claim as my invention—

1. The combination, with the descending end pieces C and folding back B, of the concavo-convex top and front D, substantially as specified.

2. In a sewing-machine table, the hinged descending sides C, folding back B, and cover D, in combination with the recessed and slotted top A, substantially as specified.

3. Springs E, in combination with the swinging end pieces C, substantially as and for the purpose mentioned.

4. The spring pins or catches *r*, in combination with the hinged descending side C, substantially as described.

JOHN C. VETTER.

Witnesses:

O. F. MAYHEW,

JACOB W. LOEPER.